July 27, 1926.  
C. G. CURTIS  
1,593,571  
POWER PLANT COMPRISING A GAS ENGINE AND TURBINE  
Filed Feb. 28, 1922  2 Sheets-Sheet 1
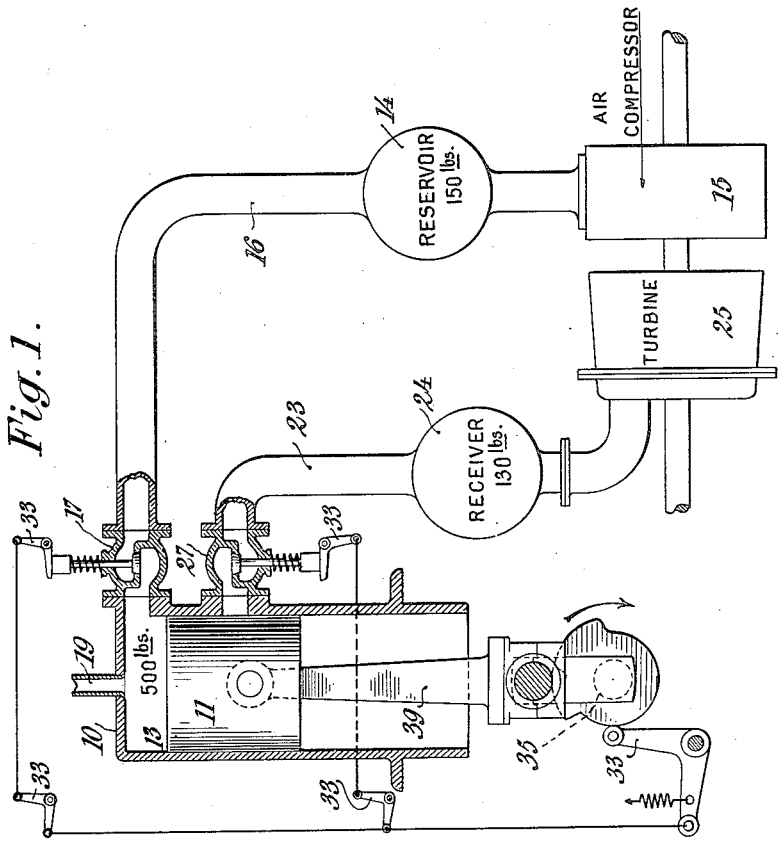
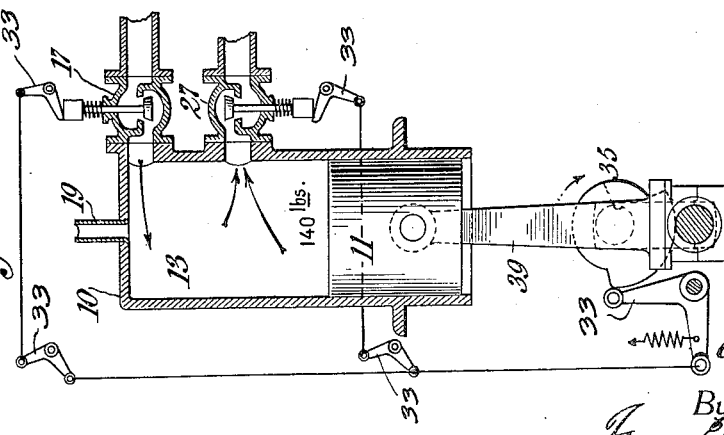
INVENTOR:  
Charles G. Curtis  
By Attorneys,  
Fraser Turk & Myers

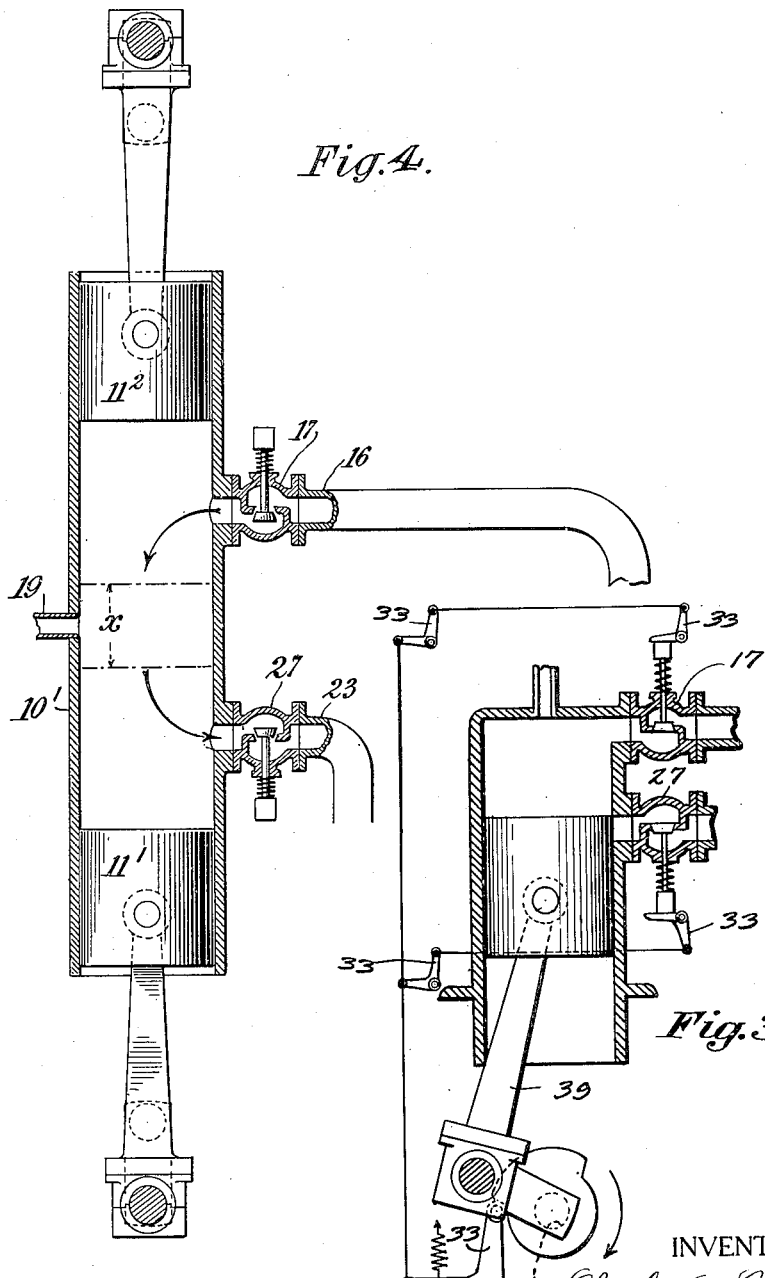

Patented July 27, 1926.

1,593,571

UNITED STATES PATENT OFFICE.

CHARLES G. CURTIS, OF NEW YORK, N. Y., ASSIGNOR TO CURTIS GAS ENGINE CORPORATION, OF NEW YORK, N. Y., A CORPORATION OF NEW YORK.

POWER PLANT COMPRISING A GAS ENGINE AND TURBINE.

Application filed February 28, 1922. Serial No. 540,072.

This invention relates to power plants comprising a gas engine and a turbine or equivalent apparatus in combination, and aims to provide improvements therein.

The present invention provides means for efficiently scavenging an internal combustion engine of a two-cycle type discharging the combusted gases at high pressure into an elastic fluid turbine or equivalent apparatus used in combination therewith. This involves admitting precompressed air to the cylinders of said engine so as to effectively displace gas from said cylinders at an approximately constant pressure substantially above atmospheric pressure.

An embodiment of an engine and plant according to the invention is illustrated in the accompanying drawings.

In said drawings:

Figure 1 is a diagrammatic view of said power plant, showing the parts of the gas engine in the position which they occupy at full compression.

Fig. 2 is a view of part of the structure shown in Fig. 1 and showing the parts of the gas engine in the position which they occupy at the end of the power stroke and at the beginning of the scavenging part of the upstroke.

Fig. 3 is a view similar to Fig. 2 showing the parts of the engine in the position which they occupy at the beginning of the compression part of the return stroke.

Fig. 4 is a diagrammatic view of a modified form of engine which may be substituted in the combination for the engine shown in Figs. 1 and 2.

Referring to said drawings, numerals 10 and 11 designate a cylinder and piston respectively, and 13 the combustion chamber in said cylinder.

14 designates a source of compressed air, such for example as a reservoir receiving compressed air from a turbo-compressor 15, and 16 designates a suitable conduit for conducting the compressed air from said reservoir to said cylinder 10. 17 designates a suitable valve for controlling the admission of air from said conduit 16 to said cylinder.

Fuel may be introduced into said cylinder in any suitable manner, preferably by injecting fuel into the air at full compression in said cylinder through an orifice 19, according to the Diesel principle, ignition taking place immediately owing to the compressed air being at a temperature above the combustion temperature of the oil.

Means 23 are provided for leading off the combusted gas, following the power stroke of the piston 11, the engine being so designed that at the end of the stroke the combusted gas will have a pressure very substantially above atmospheric, and the energy remaining in said led-off gas is utilized or converted into work in a turbine 25 of any suitable type. The means 23 is conveniently in the form of a conduit leading from the cylinder 10 to said turbine, and 27 designates a valve for controlling the flow of gas through said conduit. A receiver 24 is preferably placed in the conduit 23 for steadying the flow of gas to the turbine 25.

The valve 17 controlling the admission of compressed air is opened at or slightly before the end of the working stroke of the engine, the combusted gas being then at its point of greatest expansion in the cylinder, and the valve 27 is also opened at about the same instant, to permit the waste gas to be expelled into the receiver 24.

As the piston 11 rises on the return or compression stroke, the valves 17 and 27 are kept open until the piston reaches a point where on what remains of its return stroke, it is able to increase the pressure of the air admitted to the cylinder to the determined precombustion pressure, and the consequence, is that the combusted gas is expelled from the cylinder partly by the upward movement of the piston and partly by the scavenging air, at a pressure approximating that at its maximum expansion in the cylinder. The exhaust conduit 23 is located at or above the point in said cylinder where it is desired to have the further compression of the air by the piston begin. If the exhaust conduit 23 is located at the point where the engine compression begins, the piston will cut off the opening and therefore perform the function of a valve. With the pressures indicated on the drawings the exhaust conduit 23 should be located, roughly speaking, about one half way between the extreme ends of the stroke of the piston, as illustrated. By locating the exhaust conduit 23 as low as possible in the cylinder in proximity to the point where final compression in the cylinder is to begin, a better scavenging effect is attained.

It is not essential, however, that the exhaust conduit open into the cylinder at any particular point, as long as the said conduit is not cut off by the piston 11 up to the instant the final compression is to begin. If the exhaust port be located at or near the bottom of the cylinder substantially all of the scavenging will be effected by the precompressed air admitted to the cylinders, and only a minor part effected by the piston movement.

When the piston 11 reaches the point in its return stroke where it can, on the remaining part of its stroke further compress the air in the cylinder up to the predetermined final compression pressure, the valves 17 and 27 are closed.

Suitable valve operating means 33 are provided for opening, and keeping open, the valves 17 and 27 during that part of a stroke corresponding to the expulsion of the exhaust gas, here shown as slightly more than 90° of the movement of the crank shaft 35 to which the piston connections 37 are connected, and for thereafter closing said valves.

In Fig. 4 of the drawing there is illustrated a modification of the engine shown in Figs. 1 and 2, which modification has double opposed pistons 11¹, 11² in a single cylinder 10¹. The pistons 11¹, 11² have the same stroke and diameter as the piston 11, and there is consequently secured double the power with the same cylinder diameter, and, also, a less number of valves.

The admission conduit 16 may open into the cylinder 10¹ at or beyond the point where the compression of the pre-compressed air by said piston 11² (in conjunction with the piston 11¹) is to begin, and the exhaust conduit 23 may, as in Fig. 1, open into said cylinder at or beyond the point where said compression by the piston 11¹ (in conjunction with said piston 11²) is to begin. Valves 17' and 27 in the conduits 16 and 23, respectively, control the passage of air and gas in said conduits, as in the construction illustrated in Figs. 1 and 2, and the construction generally, is otherwise the same.

*Operation.*—Starting with the parts in the position shown in Fig. 1, that is, with the piston at the top of its stroke, and with the cylinder containing compressed air at a pressure of say 500 pounds per square inch, fuel is injected, and ignition takes place by reason of the high temperature of the compressed air. Thereupon the piston is driven by the expansion of the combusted charge.

At maximum expansion in the cylinder the arrangement is such that the combusted gas will have a pressure considerably above atmospheric pressure (140 lbs. for example), and at this pressure the exhaust valve 27 is opened and the gas led (by way of receiver 24) to the turbine 25 wherein it is expanded to utilize the energy thereof.

Compressed air is admitted by valve 17 to the cylinder 10 at about the time the valve 27 is opened, that is at about the time the gas reaches its maximum expansion in the cylinder 10 at the end of the power stroke of the piston, and the valves 17 and 27 are kept open to continue the admission of the compressed air to the cylinder and the leading off of the combusted gas to the receiver during a considerable part of the return stroke of the engine, and until a point is reached where the piston in what remains of its return stroke is able to compress the compressed air therein to the designed precombustion pressure of 500 lbs., the combusted gas being thereby expelled from the cylinder 10 by the combined action of the compressed air and of the piston 11, so that at the end of the period during which the combusted gas is being expelled from the engine all of the combusted gas has been expelled from the cylinder 10, leaving a fresh supply of air in the engine to form the air part of the new charge. The engine is thus thoroughly scavenged. By displacing gas from the engine cylinders by precompressed air without dropping its pressure more than is necessary to overcome the resistance to flow of the ports and passages, a mode of charging and scavenging which is very effective and also economical of air, and of the energy of the air and gas, is provided. By controlling the amount of air admitted to the cylinder 10 during the scavenging part of the return stroke of the piston 11, an amount of air in excess of that required for scavenging may be passed through the cylinder, and into the receiver 24, thereby reducing the temperature of the gas within the receiver; so that by increasing the pressure of the incoming air the amount of excess air admitted during the interval mentioned, may be increased and the temperature of the gas in the receiver reduced to any desired degree.

The pressure of the precompressed air in the reservoir 14 is somewhat above that existing at the point where the combusted gas leaves the engine, in order to overcome the resistance of the valves and conduits leading to the receiver 24. For example, the precompressed air may have a pressure of 150 lbs. per square inch, and the pressure of the combusted gas at the point where it leaves the cylinder may be 140 lbs. per square inch, dropping to say 130 lbs. in the receiver 24.

After the combusted gas has been expelled from the cylinder 10 the air admission valve 17 and the exhaust valve 27 are closed (at a point corresponding to about one-half or somewhat more than one-half of a stroke in the illustrated example), and the compressed air in the cylinder 10 (at 140 lbs. or slightly higher in the case illustrated), is further compressed to the precombustion pressure (500 lbs. for example). The cycle just described may thereupon be repeated.

Efficient and effective scavenging of the engine cylinders is necessary to the success of a combination power plant comprising a pre-charged two-stroke cycle engine and a turbine or equivalent apparatus. In order to efficiently and effectively scavenge such an engine it is important that the supply of precompressed air be maintained at approximately constant pressure, that the loss of pressure between said air supply and the supply to the secondary apparatus be reduced to the minimum required to overcome the resistance of the valves and passages, and that the supply to the secondary apparatus be maintained at an approximately constant pressure.

Referring to Fig. 3 in which the pistons are shown at the outer ends of their stroke, and the valves 17 and 27 having just been opened, air from the reservoir 14 will flow into the cylinder $10^1$ at say 140 lbs. and a forced flow of gas through the valve 27 to the receiver 24 begun. The piston $11^1$ will act to expel the gas ahead of it, on part of its return stroke, and the piston $11^2$ on the corresponding part of its return stroke will act to push the gas into the stream of air entering through valve 17, so that the waste gas will be expelled through the valve 27, (and to the receiver 24 and turbine 25) by the joint action of the pistons $11^1$ and $11^2$ and the compressed air entering through valve 17. When the pistons $11^1$ and $11^2$ reach a point in their stroke where on what remains thereof, they are able to increase the pressure of the air admitted to the cylinder to the determined final or precombustion pressure, the valves $11^1$ and $11^2$ are thereupon closed, and the final compression of the air in the cylinder is carried out (from 140 to 500 lbs.). At full compression, (500 lbs.) fuel is injected and ignited, and the pistons are driven throughout their full stroke by the expansion of the gas. At the end of the power stroke, the pistons are in the position shown in Fig. 3, the valves 17 and 27 are opened whereupon and during a part of the return stroke of the pistons, the waste gas flows into the receiver 34 (at say 130 lbs.) and the cycle just described is repeated.

Comparing the present engine with an ordinary Diesel having the same final compression, the present engine, due to exhausting it at a higher pressure, requires fewer expansions and hence has a shorter stroke. Shorter strokes obviously admit of greater speeds of rotation. The cylinder dimensions required for any power are materially reduced, as compared with the ordinary Diesel engine, due to the supercharging of its cylinders to a pressure substantially above atmospheric pressure and to the permissible increased speed of rotation. By transferring the partially expanded gas from the cylinders of the engine to a turbine to develop power in addition to that developed by the engine cylinders, with no more loss of pressure between the air supply pressure and turbine than is necessary to overcome the resistance of the valves or passages, and due to the fact that the expansion in the turbine may be carried to a materially lower pressure than is possible in the ordinary Diesel it is possible to obtain as high an overall efficiency out of the combination apparatus as is obtained in the ordinary Diesel. Charging and scavenging with air precompressed to a pressure approximately that at which the gas is transferred to the turbine (except for the extra pressure to overcome resistance) avoids unnecessary loss of work of compression, and hence avoids loss of efficiency due to unnecessary work of compression. As compressors are relatively inefficient apparatus, the use of the air in such manner as not to unnecessarily lose work of compression is important.

While the turbine is shown and specifically described as driving the air compressor, nevertheless the said turbine or other secondary apparatus may be otherwise utilized to develop power in addition to that developed by the engine cylinders, for any desired purpose.

While in describing the construction and operation of the engine one cylinder has been referred to for simplicity, nevertheless it is to be understood that the invention is ordinarily carried into practice by using a multi-cylinder engine.

The invention may receive other embodiments than that herein specifically illustrated and described.

What I claim is:—

1. A compound power plant comprising a two-stroke cycle internal combustion engine in which the gas after combustion undergoes a partial expansion within the cylinder of said engine, a secondary expansion apparatus to which the said partially expanded gas is transferred and therein expanded to approximately atmospheric pressure, and means for producing precompressed air, an inlet passage arranged to open and to admit said precompressed air to the engine cylinder at an approximately constant pressure substantially above atmospheric pressure while the piston of said engine is passing through its lower dead center period, said air admission being arranged to displace gas in said cylinder at an approximately constant pressure and to drive it over and supply it to said secondary expansion apparatus through an exhaust opening at an approximately constant pressure substantially above atmospheric pressure, said inlet air passage being arranged to be closed at or before the time the exhaust opening is closed, said engine being arranged to supply power for external purposes from its drive shaft.

2. A power plant according to claim 1, further including means for absorbing the power of said secondary expansion apparatus in compressing said precompressed air.

3. A power plant according to claim 1, further characterized by said secondary expansion apparatus being an elastic fluid turbine and said compressing means being a rotary compressor driven by said turbine.

4. A power plant according to claim 1, further including means for displacing part of the gas from said cylinder by the return movement of the piston.

5. A power plant according to claim 1, in which said exhaust opening is located at the point where engine compression is to begin.

In witness whereof, I have hereunto signed my name.

CHARLES G. CURTIS.